United States Patent [19]

Andrews

[11] 4,215,903
[45] Aug. 5, 1980

[54] FLUID-FLOW CONTROL VALVES

[75] Inventor: Paul R. Andrews, Mytholmroyd, England

[73] Assignee: Staveley Machine Tools Limited, Halifax, England

[21] Appl. No.: 915,236

[22] Filed: Jun. 13, 1978

[30] Foreign Application Priority Data

Jul. 6, 1977 [GB] United Kingdom ............... 28208/77

[51] Int. Cl.² .............................................. F16C 32/06
[52] U.S. Cl. ....................................... 308/1 R; 308/9; 137/118
[58] Field of Search ....................... 308/9, 8, 3 A, 3 R, 308/5 R, 1; 137/118, 101

[56] References Cited

U.S. PATENT DOCUMENTS

| | | | |
|---|---|---|---|
| 2,930,391 | 3/1960 | Bass et al. | 137/118 |
| 2,992,652 | 7/1961 | Fellberg | 137/118 |
| 3,618,383 | 11/1971 | Holben | 137/101 |

FOREIGN PATENT DOCUMENTS

1337742 11/1973 United Kingdom ......................... 308/9

Primary Examiner—Lenard A. Footland
Attorney, Agent, or Firm—Norris & Bateman

[57] ABSTRACT

Hydrostatic bearing arrangements in which there is a fluid-flow control valve adapted to exercise an automatic pressure responsive control over two fluid-flow outputs to a pair of bearings. The valve has a diaphragm located between two control surfaces formed by bosses so that a fluid-flow restriction is formed between the diaphragm and each of the control surfaces, whereby movement of the diaphragm in a direction to close one of the restrictions opens the other restriction and vice versa, there being a single fluid supply port opening through one of the control surfaces into the restriction between that surface and the diaphragm and a communicating port through the diaphragm substantially aligned with said inlet port.

8 Claims, 6 Drawing Figures

FLUID-FLOW CONTROL VALVES

This invention is concerned with hydrostatic bearing arrangements in which there is a fluid-flow control valve which is adapted to exercise an automtic pressure responsive control over two fluid-flow outputs to a pair of bearings. Some machines (e.g. horizontal boring machines) have a pair of relatively movable members, for instance a machine headstock and ram slidable horizontally in the headstock, the movable member being supported by hydrostatic bearings carried by the stationary member. In such an arrangement one finds oppositely acting bearings, for example a bearing under the ram and a bearing above the ram, or bearings acting on opposite vertical faces of the ram.

If the movable member tends to move under load, in a direction perpendicular to its permitted operational movement, this will tend to narrow the clearance between the bearing and the movable member at one side of the movable member and to widen the clearance at the other side.

It is desirable to be able to control the location of the movable member relatively to the stationary member, (and preferably to restore it to its original disposition) and various fluid-flow control arrangements for this purpose have been devised. In the specification of United Kingdom Pat. No. 1,027,395 (MOSHIN) there is described an arrangement which employs a control valve and a so-called adding valve arranged in a supply circuit to a pair of oppositely acting hydrostatic bearings. United Kingdom Pat. No. 1,337,742 (ENNIS) describes an arrangement employing sealed hydrostatic bearings with a control valve and an adding valve. The valves used in these arrangements are relatively complicated and the object of the present invention is to provide a bearing arrangement which employs a valve of very simple form having regard to the relative complexity of the functions it performs.

According to the invention a hydrostatic bearing arrangement includes a fluid-flow control valve; this valve comprising a body defining a chamber therein; a boss projecting inwardly from each end wall of the chamber; the inner end faces of the bosses providing opposed control surfaces; a flexible diaphragm extending across the chamber and making a fluid tight seal with the walls of the chamber; the diaphragm being positioned between the two bosses so that there is a throat providing a variable fluid-flow restriction between each side of the diaphragm and a respective one of the control surfaces on the two bosses whereby movement of the diaphragm in a direction to close one of the fluid flow restrictions opens the other fluid-flow restriction and vice versa; a single fluid inlet port opening through one of the control surfaces into the restriction between that surface and the diaphragm; a communicating port through the diaphragm substantially aligned with the fluid inlet port, whereby fluid can pass from one side of the diaphragm to the other without being subjected to any restriction due to interaction of the diaphragm and the control surface through which the inlet port opens, an outlet port communicating with the opposite side of each fluid-flow restriction to the inlet port; two hydrostatic bearings connected to the outlet ports of the fluid-flow control valve so that the fluid supply of the bearings passes through respective ones of the two fluid-flow restrictions in the valve, the two bearings being mounted on the first of a pair of relatively movable members in a machine and the two bearings acting on oppositely facing surfaces of the second of the pair of relatively movable members, the arrangement providing that if the relatively movable members tend to approach each other so as to narrow the clearance at one of the bearings and to increase it at the other of the bearings, the resultant increases in fluid pressure at the bearing where the clearance tends to narrow causes movement of the diaphragm to open the restriction appertaining that bearing and to close the restriction appertaining to the other bearing, so that the fluid supply from the control valve to the bearings tends to restore the location of the second relatively movable member with respect to the first relatively movable member.

It is possible to build two or more of the valves into a stack, and according to another preferred feature of the invention two such valves are combined in a stack, and a single inlet passage communicates with an inlet port of each of the two valves. This may be done by stacking the two valves in a back-to-back arrangement, with the inlet passage between them.

In one such arrangement, the inlet passage is in a manifold block, the two valves being mounted on the block, preferably on opposite sides thereof. It is possible to mount a series of valves on a single manifold block in this way with a common inlet manifold passage communicating with all the inlet passages. As an alternative to mounting pairs of valves on the manifold block, the valves could be mounted on such a manifold block, but with a separate inlet passage leading from a common manifold inlet passage to each of the valves.

In another arrangement, a common inlet passage is formed through a stack of valves, this passage including an inlet port at each control surface, and a communication port through each valve member.

If the invention is used with sealed hydrostatic bearings, that is to say, bearings which are so constructed that there is little or no flow of fluid from the bearing, then it is preferred to employ a fluid-flow type sensor device operating in parallel with one of the bearings and sensing relative movement of the two relatively movable members in a direction to narrow or widen the clearance at the bearings by pressure variations in the fluid flowing through it. The pressure variations produced by this sensor have the same kind of effect on the valve member as the effect produced by pressure changes with the conventional non-sealed hydrostatic bearings. In order to ensure the self-correcting effect of the valve in a sealed bearing arrangement it is preferred to provide a fluid outlet from the fluid feed to the bearing which is opposed to that with which the sensor is in parallel. Preferably this outlet is restricted.

Various forms of the invention will now be described by way of examples only, with reference to the accompanying drawings, in which.

Figure 1:
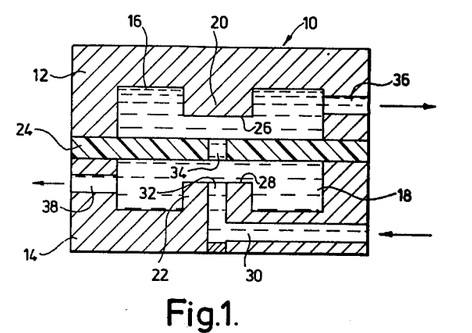
FIG. 1 is a diagrammatic cross-section through a simple form of valve.

In FIG. 1 there is illustrated a valve 10, which has a generally cylindrical valve body made up of upper and lower portions 12 and 14. These upper and lower portions are similar in shape, but as is clear from FIG. 1, they are assembled in a face-to-face relationship. Each of the two portions of the valve body, is formed with a deep circular recess 16, 18 which provides a chamber for the working fluid, but there is a central circular boss 20, 22 projecting into each of the recesses 16 and 18. A disc-like diaphragm 24, which is of the same outside diameter as the valve body portions 12 and 14 is nipped between the two body portions when the valve is assembled. It will be understood, that there are fastening screws and nuts (not shown) passing through the annular outer part of each valve body portion 12 and 14, and through the part of the diaphragm 24, which is nipped between the annular outer parts of the valve body for the purpose of securing the entire assembly together.

The diaphragm 24 is made of metal, rubber, synthetic rubber (such as neoprene) or plastics material, and has some resilience. Its central portion is located between the circular end surfaces 26 and 28 of the bosses 20 and 22, and these surfaces form the control surfaces of the valve. The diaphragm itself forms the valve member.

An inlet passage 30 is formed in the lower portion 14 of the valve body, and at its outer end, is adapted, by means not shown, to be connected to a conduit in a fluid supply circuit. The inner end of the passage 30 terminates in a port 32 in the control surface 28 of the boss 22. In this particular valve construction, there is no corresponding passage through the boss 20 in the upper valve body portion 12. A communicating port 34 of approximately the same bore size as the port 32 is formed through the centre of the diaphragm valve member 24. An outlet port 36 is formed radially through the valve body portion 12 and communicates with the chamber 16, and a similar outlet port 38 is formed through the wall of the body porion 14 this port communicating with the chamber 18. Each of the outlet ports is adapted by means not shown, to be connected to a conduit in a hydraulic circuit.

It will be clear that hydraulic fluid flowing in through the passage 30 and through the port 32 can only flow into the chamber formed by the recess 18 (and thence out through the outlet port 38) by passing through the restriction formed between the control surface 28 and the diaphragm valve member 24. It will be understood, that the fluid-flow through this construction is radially outwards in all directions around the port 32. For the purpose of illustration in FIG. 1, the restriction is shown as being quite wide, but in practice, it will be very narrow, so that a considerable restriction is effected on the fluid-flow. This restriction provides a means of controlling the pressure in the outlet from the port 38 in relation to the inlet pressure through the passage 30. The nearer the diaphragm valve member 24 approaches to the control surface 28, the greater is the restriction on fluid-flow, and consequently the larger the pressure drop across the valve to the outlet port 38.

Because of the communication port 34, fluid entering through the inlet passage 30 has a practically unimpaired flow into the chamber provided by the recess 16 in the upper portion 12 of the valve body. However, before this fluid can flow out through the outlet port 36, it has to pass through a similar restriction formed between the control surface 26 and the top surface of the diaphragm valve member 24. Hence, the pressure at the outlet port 36 can also be controlled in relation to the inlet pressure in the passage 30.

It will be apparent however, that if the diaphragm 24 is deflected downwardly, that will have the effect of increasing the resistance to fluid-flow between the control surface 28 and the diaphragm and hence reducing the pressure at the outlet port 38, but simultaneously, it will reduce the restriction between the control surface 26 and the top surface of the diaphragm 24, thereby increasing the pressure in the outlet port 36. In this manner, it is possible to effect simultaneous control of two outlet pressures in relation to a single inlet pressure, any variations in the outlet pressures being automatically of opposite sign, and approximately equal in magnitude. Hence, a valve constructed and adapted to operate substantially as shown in FIG. 1, can be used as a so-called "adding valve" in that the control exercised automatically by this valve on the outlet pressures is such that the summation of these outlet pressures always has a constant relationship to the inlet pressure.

Figure 2:
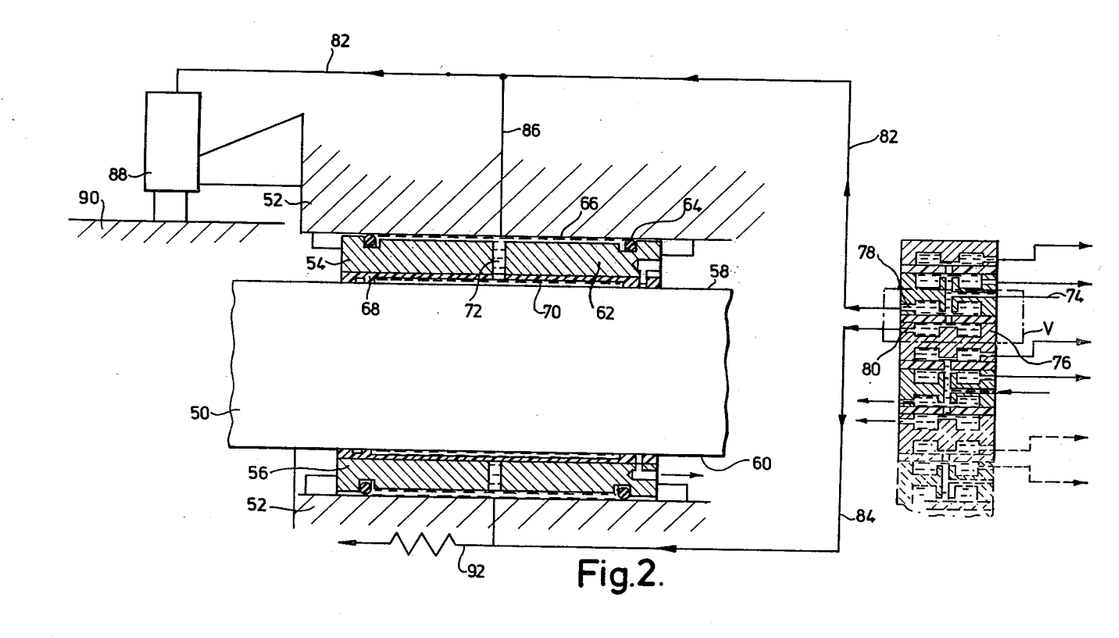
FIG. 2 is a diagram showing a hydrostatic bearing arrangement for the column of a horizontal boring machine.

A valve such as that illustrated in FIG. 1, can be particularly conveniently adapted for use with a hydrostatic bearing arrangement for use in a machine tool, as described for example, in the specification of United Kingdom Pat. No. 1,337,742, as is illustrated in FIG. 2. Part of one of the slideways of a horizontal boring machine bed is shown at 50, and part of the base of the column of the machine is shown at 52. (The diagram shown in FIG. 2 takes the form of a plan view). The column base 52 has to slide relatively to the slideway 50, and it is important to maintain the accuracy of the location of the column base relatively to the slideway, since the base is carrrying the column and the ram of the machine. A pair of oppositely acting hydrostatic bearings 54 and 56 are illustrated, acting on oppositely facing edges 58 and 60 respectively of the slideway 50. It will be appreciated that in practice, there are a number of such bearings arranged between the column base and each of the slideways 50, but for the purpose of illustrating the operation of the system, it is only necessary to illustrate the pair of bearings 54 and 56.

Each of the bearings is a sealed bearing, constructed generally as described in the specification of United Kingdom Pat. No. 1,292,175 and comprises essentially a rectangular metal pad 62, sealing against an outer face formed on the column base 52, through an "O" ring 64 so as to provide an enclosed hydraulic fluid space 66 on the outside of the pad 62 and provided with a nylon facing pad 68, which around its periphery is urged into sealing contact with the edge of the slideway 50, but which is itself formed with a recess 70 within which hydraulic fluid is contained, to provide the hydrostatic bearing effect. There is a communicating port 72 through the pad 62, from the enclosed space 66, to the enclosed space 70. If there is any slight relative transverse movement between the column base 52 and the slideway 50, this can be accommodated by compression of the "O" ring seal 64 appertaining to one of the bearings, and expansion of the "O" ring seal appertaining to the other bearing.

On the righthand side of FIG. 2, there is illustrated a stack of valves, which are intended for controlling a series of pairs of hydrostatic bearings such as that illustrated in FIG. 2, and methods of forming such a stack will be hereinafter described. For present purposes however, it is only necessary to consider a single valve within the chain-dotted line V, and this valve is constructed as described with reference to FIG. 1 of the drawings, although it will be noted, that it is shown in FIG. 2 with the inlet passage 30 in the upper portion—that is to say the valve shown in FIG. 1 has been inverted.

Hydraulic fluid under pressure is supplied from a pressure source at 74, flows through the valve 76, and then out through ports 78 and 80 to a pair of feed conduits 82 and 84. It will be understood, that the pressures in the feed conduits 82 and 84 are regulated automtically by the valve 76, in the manner described with reference to FIG. 1, so that the summation of the pressures in the conduits 82 and 84 always bears a constant relationship to the supply pressure 74.

The conduit 82 leads via a branch conduit 86 to the hydrostatic bearing 54, thus providing the hydraulic fluid for that bearing, and also to a sensor 88, which acts in relation to a reference plane (for example a straight edge) 90 remote from and not subjected to the distortions of the slideway 50. The sensor 88 is in itself a hydraulic valve arrangement, and it is so related to the reference surface 90, that there is always an escape of hydraulic fluid from the sensor 88, but the back pressure built up in the sensor 88 (and hence in the feed conduit 82) is related to the width of the gap between the sensor 88 and the reference element 90. The manner in which this type of sensor 88 operates is described in the specification of United Kingdom Pat. No. 1,337,742, and it is not necessary to describe it in detail here. Suffice it to say, that if for example, the column base 52 tends to move laterally, so as to reduce the distance between the bearing pad 54 and the edge 58 of the slideway 50, there is an increase in the pressure signal given by the sensor 88, and this increases the pressure in the feed conduit 82. This in turn has the effect of moving the diaphragm valve member 24 away from the control surface at the side of the valve appertaining to the feed conduit 82, and hence there is an increased flow of hydraulic fluid to the feed conduit 82, which increases the pressure in the fluid in the hydrostatic bearing 54, therefore tending to move the column base 52 away from the edge 58. Simultaneously, there will be a decrease in the gap between the control surface and the diaphragm valve member at the side of the valve appertaining to the feed conduit 84, and this will restrict the flow of fluid to the hydrostatic bearing 56, thereby reducing the pressure in that bearing, and allowing the column base to approach nearer to the edge 60 of the slideway 50. In this manner, the column base is restored to the correct location relatively to the bed of the machine.

In order that this system may work properly, it is necessary to provide a restricted exhaust conduit 92, through which hydraulic fluid from the system is continually returned to the hydraulic reservoir. This is because the bearings themselves are sealed, so that there is very little leakage of fluid from the system, but the supply pressure must be such as to ensure that there is always a proper pressure in the two hydrostatic bearings, and this can be done by providing an excess supply to the system, and allowing the excess to exhaust through the exhaust conduit 92.

As compared with the system which is described for example in the specification of United Kingdom Pat. No. 1,337,742, it has been possible to replace the diaphragm controlled restrictor valve, and the adding valve of that system, by the single simple valve 76. This provides both the general restriction on the supply of fluid to the system, previously provided by the diaphragm controlled restrictor valve, and also the adding valve effect.

Figure 3:
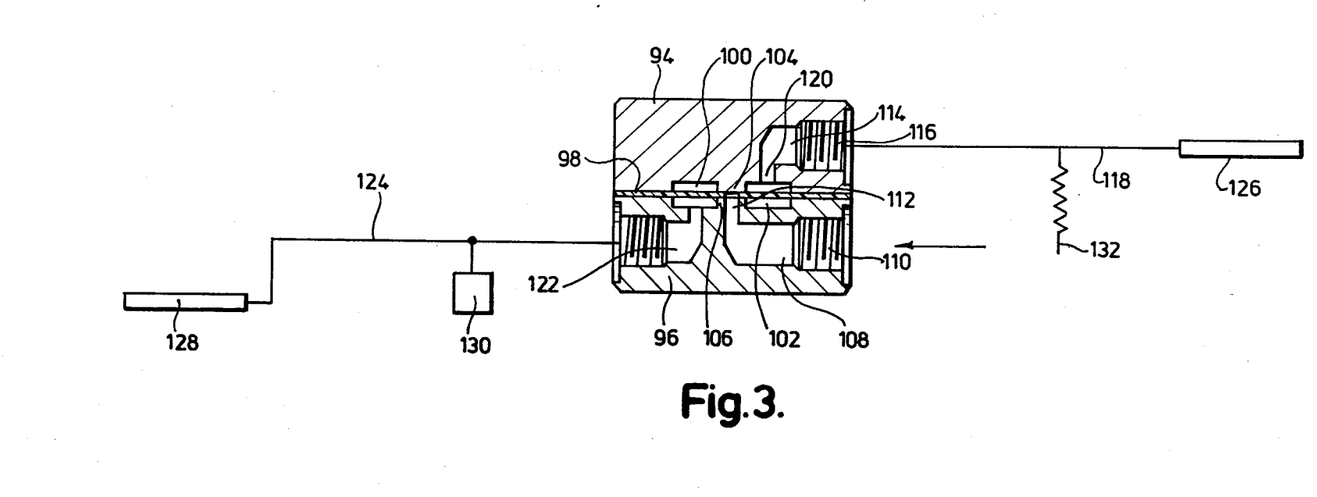
FIG. 3 is a cross-section through a practical embodiment of the invention comprising a single valve, shown diagrammatically connected in a sealed hydrostatic bearing arrangement.

The valve shown in FIG. 3 comprises a pair of metal blocks 94 and 96 with a flexible diaphragm 98 nipped between them, when the blocks are assembled and clamped together. Each of these blocks 94 and 96 is provided with an annular recess 100,102 to give the hydraulic chambers required in the valve, and the boss 104 and 106 in the centre of each annular recess provides the control surface appertaining to that side of the valve, for co-operation with the central portion of the valve member 98.

An inlet port 108 in the lower block 96 is radially directed, and has a screw-threaded connection 110 at its outer end, to receive a supply pipe (not shown) whilst at its inner end, it communicates with an axially directed port 112, leading to the control surface of the boss 106. There is a communication port passing through the centre of the valve member 98, but no port through the boss 104.

A first outlet port 114 is formed radially in the upper block 94, and has a screw-threaded portion 116 at its outer end, for connection to a supply conduit (illustrated diagrammatically at 118) and at its inner end, it communicates with an axially directed port 120, which leads into the recess 100 of the block 98. A similar outlet port 122 is formed in the lower block 96, and communicates with the recess 102 in that block, the outer end of the port being screw-threaded to receive a feed conduit 124 illustrated diagrammatically.

The valve illustrated in FIG. 3 works precisely as that which has been described with reference to FIG. 1, but FIG. 3 gives a better idea of the proportioning of the valve. It is to be noted also, that the outlet ports 114 and 122 are disposed diametrically opposite each other, and whilst this is not essential, it is preferable that they are angularly displaced, so as to facilitate the attachment of pipes to the valve. One of the advantages of the valve construction provided by the invention is that the valve is of very small size, and hence it is important to design the valve, to ensure that it is possible to connect the necessary pipes to it. In some instances, it may be necessary to ensure that all three ports 108, 114 and 122 are angularly displaced with respect to each other.

The supply conduit 118 leads to a hydrostatic bearing illustrated diagrammatically at 126, and the supply conduit 124 leads to a second hydrostatic bearing illustrated diagrammatically at 128. A sensor 130 operating on a remote straightedge or the like is connected in parallel with the hydrostatic bearing 128, and a restricted exhaust pipe 132 is connected in parallel with the hydrostatic bearing 126. Although in FIG. 3 the bearings 126 and 128 are shown on opposite sides of the valve, it is to be understood that this is purely diagrammatic, and in practice, these bearings would be arranged to act in opposition to each other as described with reference to FIG. 2.

A valve such as that illustrated in FIG. 1, FIG. 2 or FIG. 3, could be employed with a non-sealed hydrostatic bearing system, that is with a pair of oppositely directed hydrostatic bearings, of the type in which there is a continual outflow of fluid from the bearings. In that case, it would not be essential to provide the sensor 130, and the exhaust pipe 132 would not be required.

Figure 4:
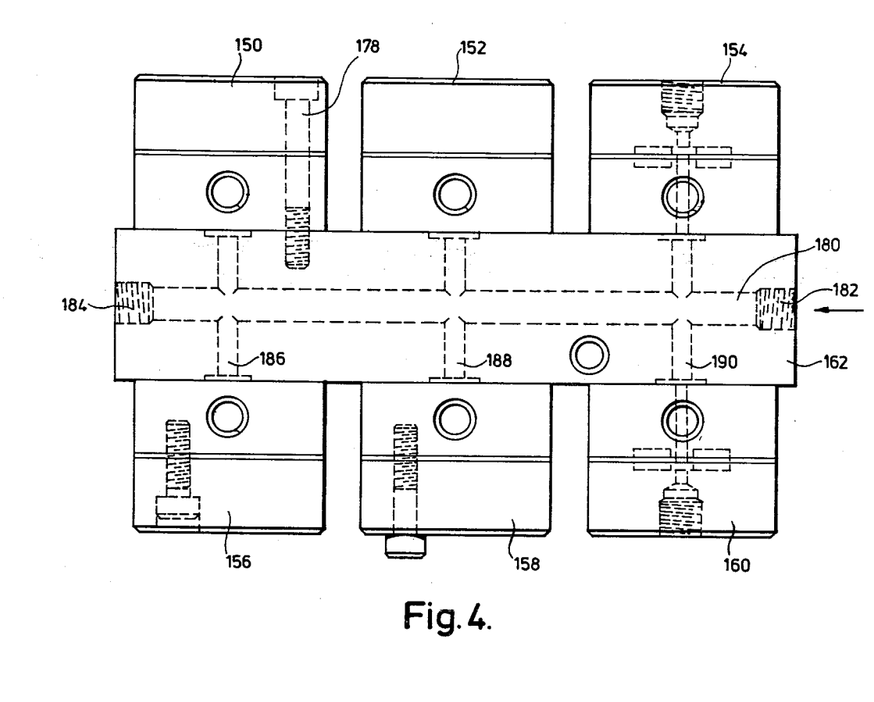
FIG. 4 is a front elevation of a set of six valves mounted on a manifold block.
Figure 5:
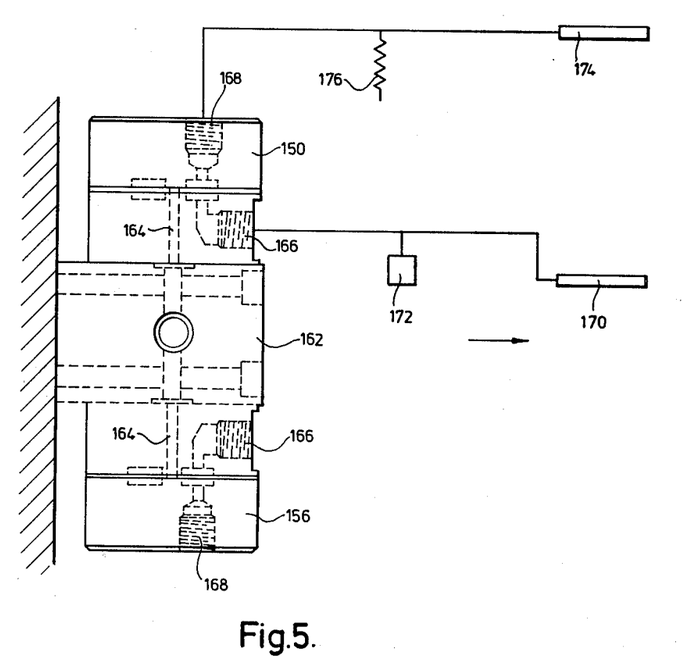
FIG. 5 is an end view of the set of valves shown in FIG. 4.

It has already been indicated, that it is possible to provide a series of valves in accordance with this invention in a single stack. One method of doing this is illustrated in FIGS. 4 and 5, wherein a series of six valves 150, 152, 154, 156, 158 and 160 is provided arranged on a manifold mounting and supply block 162. Each of the valves is constructed in similar fashion to the valve illustrated in FIG. 3, excepting that the inlet port for each valve comprises an axially directed passage 164, and of the two outlet ports from each valve, one outlet port 166 is radially directed, and the other outlet port 168 is axially directed. This is an illustration of the versatility of the valve construction, in that it is possible to arrange the inlet and outlet ports in a variety of configurations. Each of the inlet ports 164 terminates on the inside face of its valve, whereas each of the outlet ports 168 terminates on the outer face of each valve. Each of the outlet ports 166 is connected to a hydrostatic bearing, one of which is illustrated at 170, there being a sensor 172 in parallel with this hydrostatic bearing, and each of the outlet ports 168 communicates with a hydrostatic bearing, one of which is illustrated at 174, there being an exhaust pipe 176 in parallel with this bearing 174.

The six valves are secured in two sets of three, to opposite faces of the manifold block 162, as is illustrated in FIG. 4, setscrews, one of which is illustrated at 178 being used for this purpose. A common supply passage 180 is formed axially through the manifold block 162, and is screwthreaded at 182, to receive a supply pipe (not shown) and blocked by a plug 184 at its opposite end. At a longitudinal position corresponding with each opposite pair of valves, there is a transverse port 186, 188, 190, formed through the block 162, and communicating at the centre with the axial passage 180. At their outer ends, each of the ports 186, 188, 190 communicates with an inlet port 164 of one of the valves, and in this manner there is a common supply from a single supply pipe, to each of the six valves 150, 152, 154, 156, 158 and 160. The block 162 can be mounted on a convenient part of the machine, where it is accessible for servicing the valves if required. This is of course a particularly neat arrangement.

Figure 6:
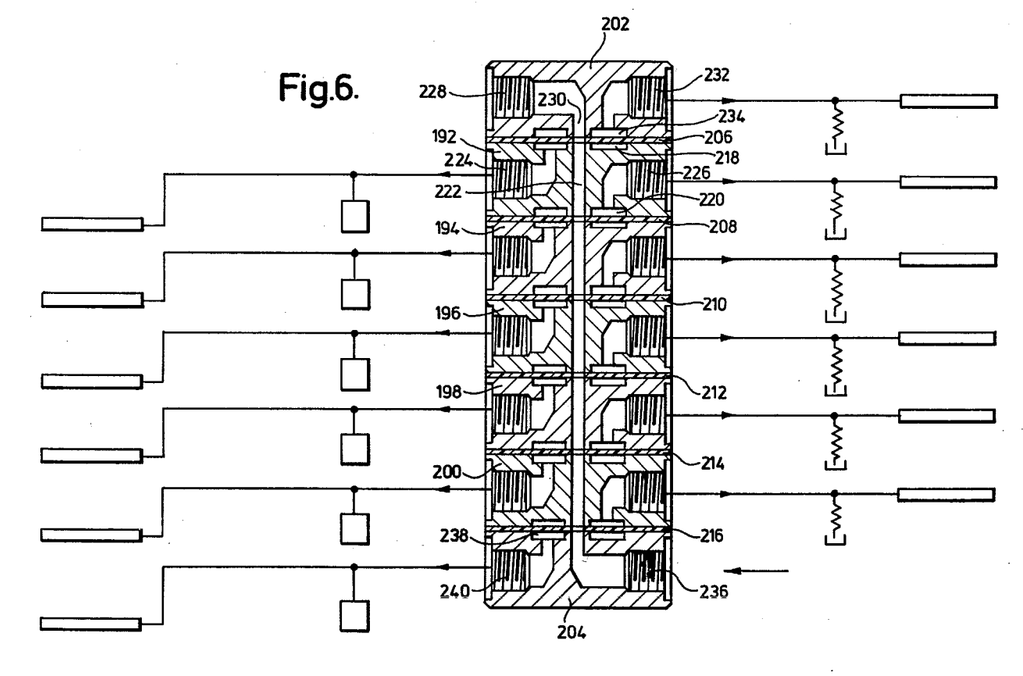
FIG. 6 is a vertical section through a "tree" of six valves.

An even more compact arrangement, which employs a stack of six valves is illustrated in FIG. 6, and in this arrangement, there is no manifold block. There are five identical intermediate blocks 192, 194, 196, 198 and 200 and a pair of identical end blocks 202 and 204, all assembled into a unitary element, with six flexible diaphragm valve members 206, 208, 210, 212, 214 and 216 sandwiched between the blocks as illustrated. Securing bolts (not shown) are passed through the entire assembly, to clamp all the blocks together, thus nipping the diaphragm valve members in their operating positions.

Taking one of the intermediate valve blocks, this is provided with an upper annular recess 218, which provides one of the chambers of a valve appertaining to the flexible valve member between that block and the next block above it. The block is also formed with a lower annular recess 220, which provides the upper chamber of a valve appertaining to the flexible valve member below that block. Thus, each of the intermediate blocks provides part of the construction of two valves of the type described with reference to FIG. 1.

An inlet communication port 222 passes through the block from top to bottom, coaxially therewith, and it is a feature of this construction, that the communication port through each flexible valve member thus communicates with an inlet port in each of the two control faces with which that valve member co-operates.

Again referring to the exemplary intermediate block, there is a radially directed outlet port 224 communicating with the recess 218 at the top side of the block, and a diametrically opposed outlet port 226, communicating with the recess 220 at the lower side of the block. Each of the outlet ports is connected via suitable conduits to a hydrostatic bearing as previously described with reference to FIG. 3.

Turning now to the upper end block 202, this is formed with an inlet port 228, which at its inner end communicates with an axially directed port 230, which forms an extension of the axial communicating inlet port 222 passing through all the intermediate blocks. The upper end block 202 also has a single outlet port 232, which is in communication with an annular recess 234 in the lower face of that block. Thus, the upper end block 202 provides only a single chamber, and therefore only one-half of one of the six valves provided by the assembly.

The lower block 204 is identical with the upper block 202, and thus provides an inlet port 236, which communicates with the common inlet passage 222 passing through the intermediate blocks, a single annular recess 238 which provides one half of the bottom valve of the stack, and a single outlet port 240.

Each of the valves is thus provided between a pair of blocks, and each of the intermediate blocks forms part of two valves, whereas each of the end blocks forms part of a single valve. This construction also illustrates the fact that it is possible to have a common supply passage passing through the centres of a series of valves each generally constructed in the form shown in FIG. 3.

Furthermore, in all the examples illustrated in the drawings, the diaphragm 24,98,206,208,210,212,214,216 is shown as being of constant cross-sectional thickness. However, it may be desirable to use a diaphragm having a non-uniform cross-secton as a means of improving the responsive performance of the valve.

I claim:

1. A hydrostatic bearing arrangement including a fluid-flow control valve; said valve comprising a body defining a chamber therein; a boss projecting inwardly from each end wall of said chamber; the inner end faces of said bosses providing opposed control surfaces; a flexible diaphragm extending across said chamber and making a fluid tight seal with the walls of said chamber; said diaphragm being positioned between said two bosses so that there is a throat providing a variable fluid-flow restriction between each side of said diaphragm and a respective one of said control surfaces on said bosses, whereby movement of said diaphragm in a direction to close one of said fluid-flow restrictions opens the other fluid-flow restriction and vice versa; a single fluid inlet port opening through one of said control surfaces into the restriction between that surface and the diaphragm; a communicating port through said diaphragm substantially aligned with said fluid inlet port, whereby fluid can pass from one side of said diaphragm to the other without being subjected to any restriction due to interaction of said diaphragm and said control surface through which said inlet port opens; an outlet port communicating with the opposite side of each fluid-flow restriction to said inlet port; two hydrostatic bearings connected to said outlet ports of said fluid-flow control valve so that the fluid supply of the bearings passes through respective ones of said two fluid-flow restrictions in said valve, said two bearings being mounted on the first of a pair of relatively movable members in a machine and said two bearings acting on oppositely facing surfaces of the second of said pair of relatively movable members, the arrangement providing that if said relatively movable members tend to approach each other so as to narrow the clearance at one of said bearings and to increase it at the other of said bearings, the resultant increase in fluid pressure at the bearing where the clearance tends to narrow causes movement of said diaphragm to open the restriction appertaining to that bearing and to close the restriction appertaining to the other bearing, so that the fluid supply from said control valve to said bearings tends to restore the location of said second relatively movable member with respect to said first relatively movable member.

2. A hydrostatic bearing arrangement including a valve assembly comprising two fluid-flow control valves, each in accordance with claim 1, combined in a stack with a single inlet passage communicating with said single inlet port in each of said two valves.

3. A hydrostatic bearing arrangement according to claim 2, wherein said two valves are stacked in a back-to-back arrangement, with said inlet passge between them.

4. A hydrostatic bearing arrangement according to claim 3, wherein said inlet passage is in a manifold block, said two valves being mounted on said block.

5. A hydrostatic bearing arrangement according to claim 4, wherein a series of control valves (each in accordance with claim 1) is mounted on a single manifold block, with a common inlet manifold passage communicating with all the inlet passages of said series of valves.

6. A hydrostatic bearing arrangement comprising a stack of at least two valves, each constructed in accordance with claim 1, wherein a common inlet passage is formed through said stack, said inlet passage including an inlet port at each control surface in each valve, and a communicating port through each valve member.

7. A hydrostatic bearing arrangement according to claim 1, wherein said hydrostatic bearings are so constructed that there is substantially no flow of fluid from them and a fluid-flow sensor device is employed operating in parallel with one of said bearings and sensing relative movement of said two relatively movable members in a direction to vary the clearance at the bearings by pressure variations in the fluid flowing through it.

8. A hydrostatic bearing arrangement according to claim 7, wherein there is provided a fluid outlet from the fluid feed to that bearing which is opposed to that with which said sensor in parallel.

* * * * *